US012227205B2

(12) United States Patent
Wang et al.

(10) Patent No.: US 12,227,205 B2
(45) Date of Patent: Feb. 18, 2025

(54) PROACTIVE LANE CHANGE FOR AUTONOMOUS VEHICLES

(71) Applicant: TuSimple, Inc., San Diego, CA (US)

(72) Inventors: Lei Wang, San Diego, CA (US); Yujia Wu, San Diego, CA (US); Yufei Zhao, San Diego, CA (US); Weiyang Zhang, San Diego, CA (US); Haoming Sun, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 423 days.

(21) Appl. No.: 17/150,360

(22) Filed: Jan. 15, 2021

(65) Prior Publication Data

US 2022/0227390 A1    Jul. 21, 2022

(51) Int. Cl.
*B60W 60/00*    (2020.01)
*B60W 30/18*    (2012.01)

(52) U.S. Cl.
CPC .. *B60W 60/0011* (2020.02); *B60W 30/18163* (2013.01); *B60W 60/0021* (2020.02); *B60W 60/0023* (2020.02); *B60W 2552/10* (2020.02); *B60W 2556/50* (2020.02)

(58) Field of Classification Search
CPC ....... B60W 60/0011; B60W 30/18163; B60W 60/0021; B60W 60/0023; B60W 2552/10; B60W 2556/50; B60W 2520/105; 2552/53; B60W 2554/4041; B60W 2554/4049; B60W 2554/406; B60W 2554/802; B60W 60/00274; B60W 60/001
See application file for complete search history.

(56) References Cited

U.S. PATENT DOCUMENTS

| | | | |
|---|---|---|---|
| 2016/0325743 A1* | 11/2016 | Schmüdderich | B60W 30/14 |
| 2017/0102705 A1* | 4/2017 | Silvlin | B60W 30/18163 |
| 2017/0242435 A1* | 8/2017 | Nilsson | G08G 1/167 |
| 2018/0011496 A1* | 1/2018 | Fairfield | B60W 60/0011 |
| 2018/0339708 A1* | 11/2018 | Geller | B60L 3/0015 |

(Continued)

FOREIGN PATENT DOCUMENTS

| | | |
|---|---|---|
| WO | WO2019/235117 A1 | 12/2019 |
| WO | 2020035728 A3 | 2/2020 |
| WO | 2020065416 A1 | 4/2020 |

OTHER PUBLICATIONS

Extended European Search Report; dated Jun. 20, 2022; Application/Patent No. 22151481.3-1012.

*Primary Examiner* — Justin S Lee
*Assistant Examiner* — Alexander George Matta
(74) *Attorney, Agent, or Firm* — Perkins Coie LLP

(57) ABSTRACT

A system includes an autonomous vehicle (AV) configured to travel along a road and a control device communicatively coupled to the AV. The control device determines that the AV should move from a current lane of the road to an adjacent lane of the road. The control device determines two or more candidate windows into which the AV may move in the adjacent lane. Each candidate window corresponds to a space in the adjacent lane between two vehicles traveling in the adjacent lane. The control device determines that the AV should move into a first candidate window, and, in response to this determination, causes the AV to begin moving along a trajectory leading to the first candidate window (e.g., by accelerating or decelerating).

17 Claims, 7 Drawing Sheets

(56) References Cited

U.S. PATENT DOCUMENTS

| | | |
|---|---|---|
| 2019/0071092 A1 | 3/2019 | Ma et al. |
| 2019/0071093 A1 | 3/2019 | Ma et al. |
| 2019/0176830 A1 | 6/2019 | Lei et al. |
| 2019/0220015 A1 | 7/2019 | Phillips et al. |
| 2019/0276029 A1* | 9/2019 | Umeda ................ G06V 20/584 |
| 2019/0329777 A1* | 10/2019 | Rajab .................... B60W 40/04 |
| 2019/0347820 A1 | 11/2019 | Golinsky et al. |
| 2019/0377352 A1* | 12/2019 | Weißwange ...... B60W 60/0027 |
| 2020/0391746 A1* | 12/2020 | Parks .............. B60W 60/00276 |
| 2021/0061282 A1* | 3/2021 | Jafari Tafti ..... B60W 60/00276 |
| 2021/0197858 A1* | 7/2021 | Zhang ............... B60W 30/0956 |
| 2021/0261133 A1* | 8/2021 | Sakayori ......... B60W 30/18163 |
| 2022/0185289 A1* | 6/2022 | Arora ................ B62D 15/0265 |

* cited by examiner

| 202 Time | 204 Trajectory - catch | 206 Movement cost |
|---|---|---|
| T1 | $(s(t), v(t), a(t))_{T1}$ | $MC_1$ |
| T2 | $(s(t), v(t), a(t))_{T2}$ | $MC_2$ |
| T3 | $(s(t), v(t), a(t))_{T3}$ | $MC_3 < MC_{1,2,...M}$ |
| ⋮ | ⋮ | ⋮ |
| TM | $(s(t), v(t), a(t))_{TM}$ | $MC_M$ |

*FIG. 2A*

| 222 Time | 224 Trajectory - lane change | 226 Lane - change cost |
|---|---|---|
| T4 | $(s(t), v(t), a(t))_{T4}$ | $LCC_4$ |
| T5 | $(s(t), v(t), a(t))_{T5}$ | $LCC_5$ |
| T6 | $(s(t), v(t), a(t))_{T6}$ | $LCC_6 < LCC_{4,5,...M}$ |
| ⋮ | ⋮ | ⋮ |
| TM | $(s(t), v(t), a(t))_{TM}$ | $LCC_M$ |

*FIG. 2B*

| 242 Window | 244 Trajectory | 246 Cost |
|---|---|---|
| window1 | $(s(t), v(t), a(t))_1$ | $C_1$ |
| window2 | $(s(t), v(t), a(t))_2$ | $C_2$ |
| window3 | $(s(t), v(t), a(t))_3$ | $C_3 < C_{1,3,4}$ |
| window4 | $(s(t), v(t), a(t))_4$ | $C_4$ |

*FIG. 2C*

PROACTIVE LANE CHANGE FOR AUTONOMOUS VEHICLES

TECHNICAL FIELD

The present disclosure relates generally to autonomous vehicles. More particularly, in certain embodiments, the present disclosure is related to proactive lane change for autonomous vehicles.

BACKGROUND

One aim of autonomous vehicle technology is to provide vehicles that can safely navigate towards a destination with limited or no driver assistance. In some cases, an autonomous vehicle may allow a driver to operate the autonomous vehicle as a conventional vehicle by controlling the steering, throttle, clutch, gear shifter, and/or other vehicle control devices. In other cases, a driver may engage the autonomous vehicle navigation technology to allow the vehicle to drive autonomously. There exists a need to operate autonomous vehicles more safely and reliably.

SUMMARY

In an embodiment, a system includes an autonomous vehicle (AV) configured to travel along a road and a control device communicatively coupled to the AV. The control device determines that the AV should move from a current lane of the road to an adjacent lane of the road. The control device determines two or more candidate windows into which the AV may move in the adjacent lane. Each candidate window corresponds to a space in the adjacent lane between two vehicles traveling in the adjacent lane. The control device determines that the AV should move into a first candidate window, and, in response to this determination, causes the AV to begin moving along a trajectory leading toward the first candidate window (e.g., by accelerating or decelerating).

This disclosure recognizes various problems and previously unmet needs related to AV navigation and driving. For example, previous AV navigation technology lacks tools for proactively changing lanes, for instance, when a lane change is needed but sufficient space is not available next to the AV. For instance, previous technology may require that the AV wait until a space next to the AV is empty before the AV can change lanes. Depending on traffic patterns, this may result in the AV waiting a long time before a lane change is possible. In some cases, this may result in the AV not being able to stay on its desired path or route. For example, a lane change may be needed to enter or exit a highway along a route. In an attempt to keep the AV moving along the desired route, previous technology may require that the AV be operated, at least temporarily, in a non-autonomous state such that a driver can steer the AV to perform the lane change.

Certain embodiments of this disclosure solve problems of previous technology, including those described above, by facilitating proactive lane changes in an efficient, safe, and reliable manner. For example, the disclosed systems provide several technical advantages by determining a space (referred to herein as a "window") between a pair of vehicles into which an automated lane change can be performed safely and causing the AV to begin movements (e.g., whether acceleration or deceleration) to travel into the space. In some embodiments, the safety and comfort of lane change may be improved by determining movement and lane change costs of different possible trajectories for moving into available windows and selecting the window and trajectory with the lowest cost. As such, this disclosure may improve the function of computer systems used for AV navigation during at least a portion of a journey taken by an AV. In some embodiments, this disclosure may be integrated into the practical application of a control device for an AV which allows the AV to proactively change lanes without waiting for a space to become available next to the AV and without human intervention (e.g., steering by a driver). The control device may facilitate automated lane changes more rapidly and more safely than was possible using previous technology. This may allow the AV to safely and reliably maintain its route without driver intervention. The control device may also facilitate lane changes in scenarios where vehicles are closely spaced in the adjacent lane into which a lance change is desired, such that an automated lane change would not be possible using previous technology.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A is a table of example trajectories for traveling longitudinally in the current lane of the AV to reach a position adjacent to a given candidate window in different amounts of time and corresponding movement "costs" for these trajectories;

FIG. 2B is a table of example trajectories for traveling into the candidate window from FIG. 2A in different amounts of time and corresponding lane-change costs for these trajectories;

FIG. 2C is a table of example lowest-cost trajectories for traveling into different candidate windows and corresponding costs for these trajectories;

DETAILED DESCRIPTION

Figure 1:
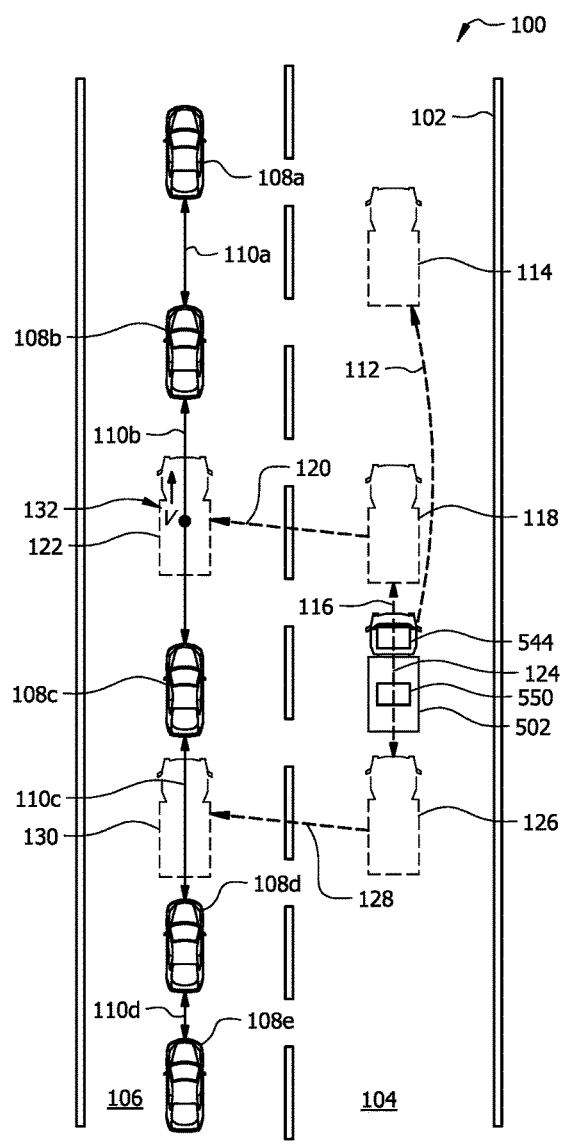
FIG. 1 is a schematic diagram of an AV traveling along a road and possible trajectories for proactive lane change movements by the AV into the adjacent lane.
Figure 3:
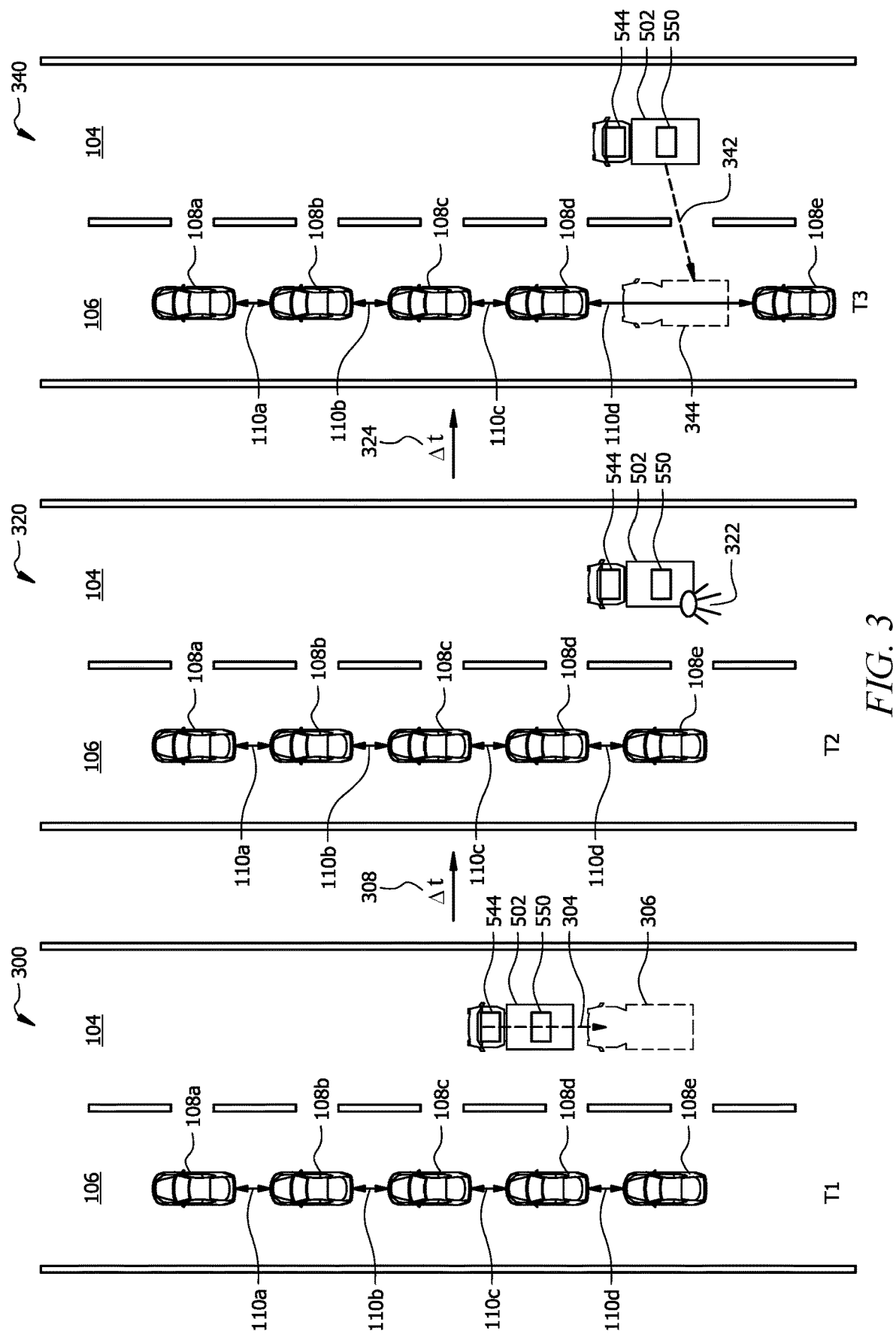
FIG. 3 is a schematic diagram an AV traveling along a road at different time points and following an example trajectory for proactive lane change into the adjacent lane.
Figure 4:
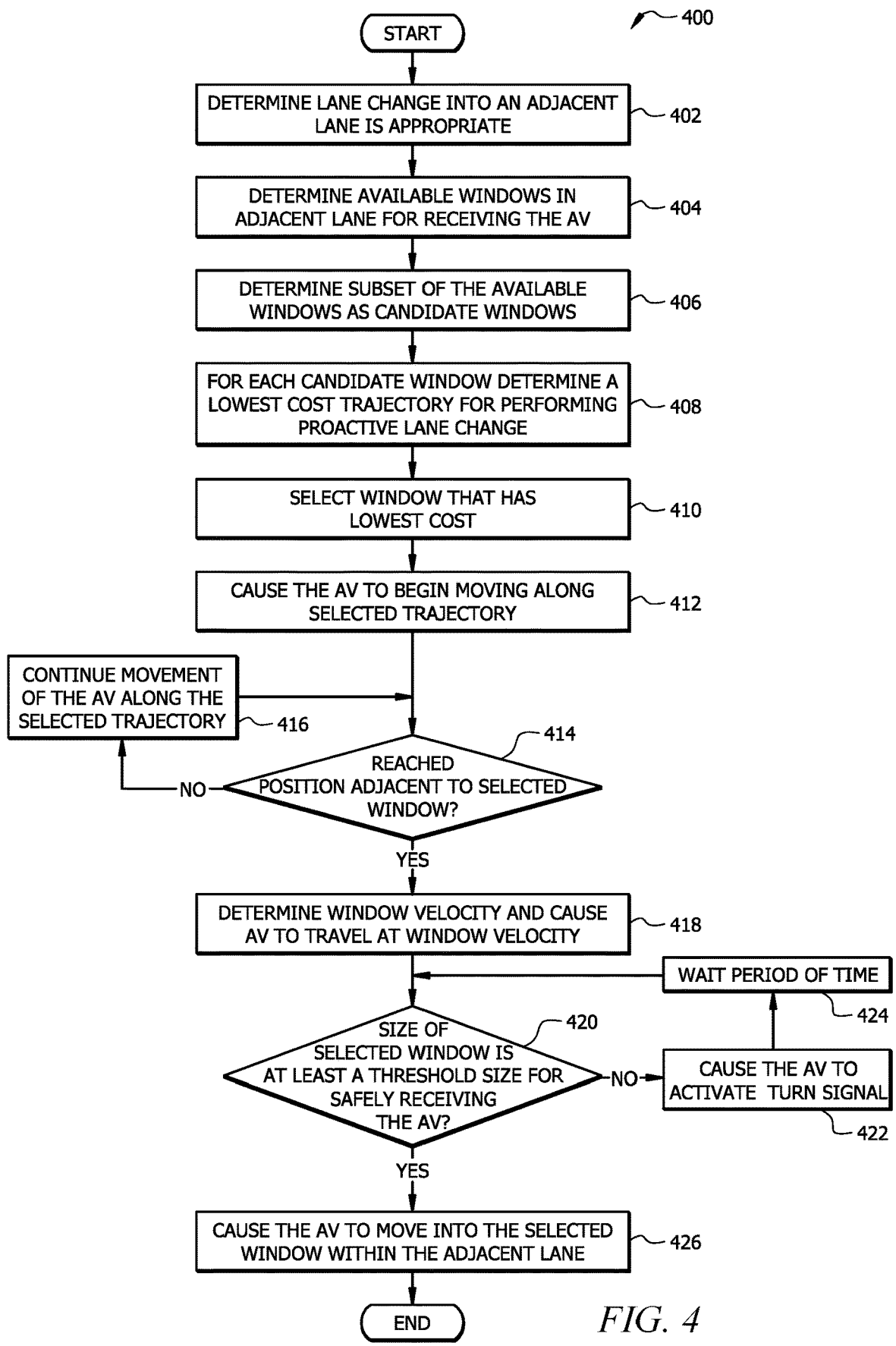
FIG. 4 is a flowchart of an example method of proactive lane change.
Figure 5:
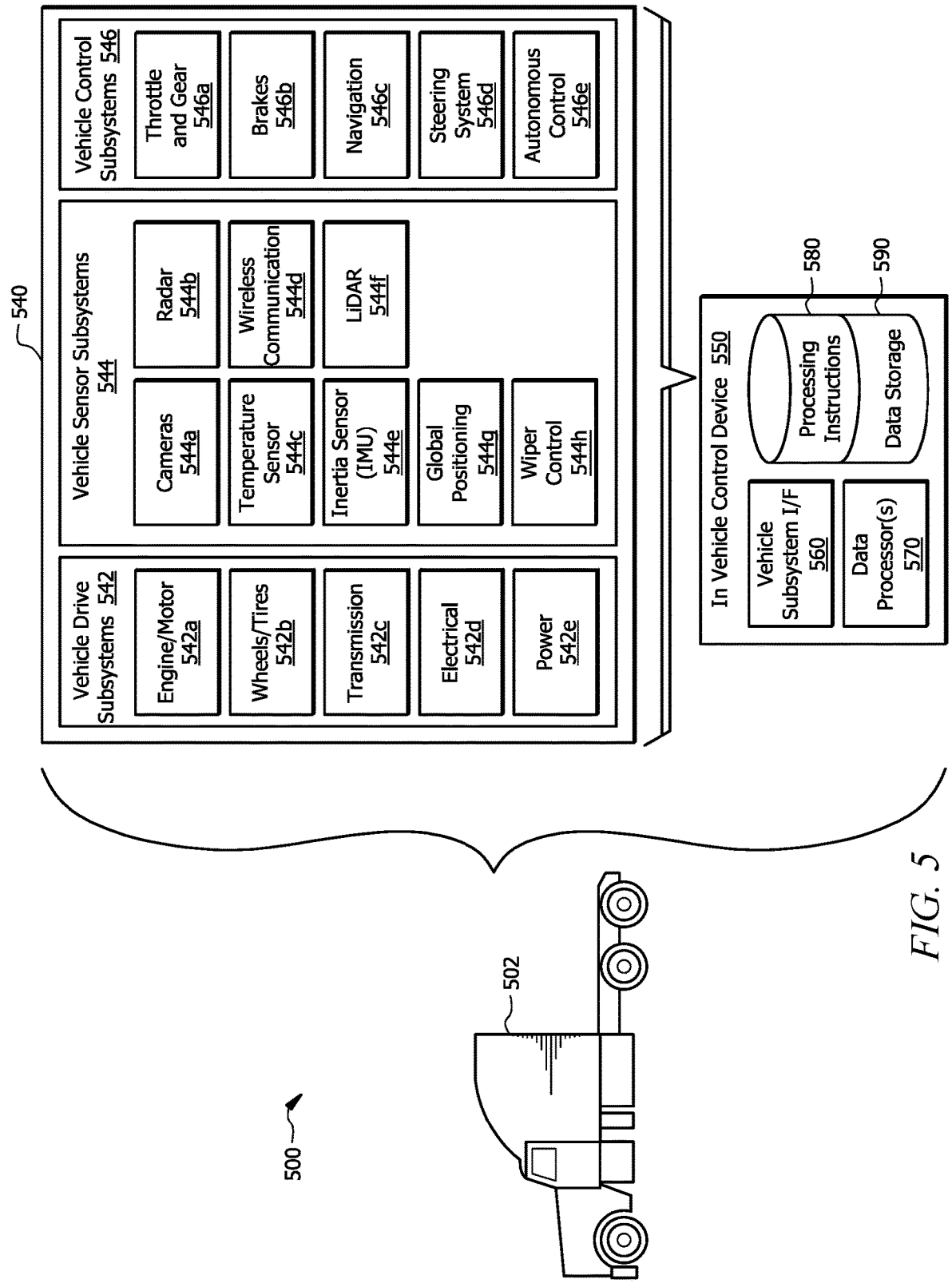
FIG. 5 is a diagram of an example AV configured to implement autonomous driving operations.
Figure 6:
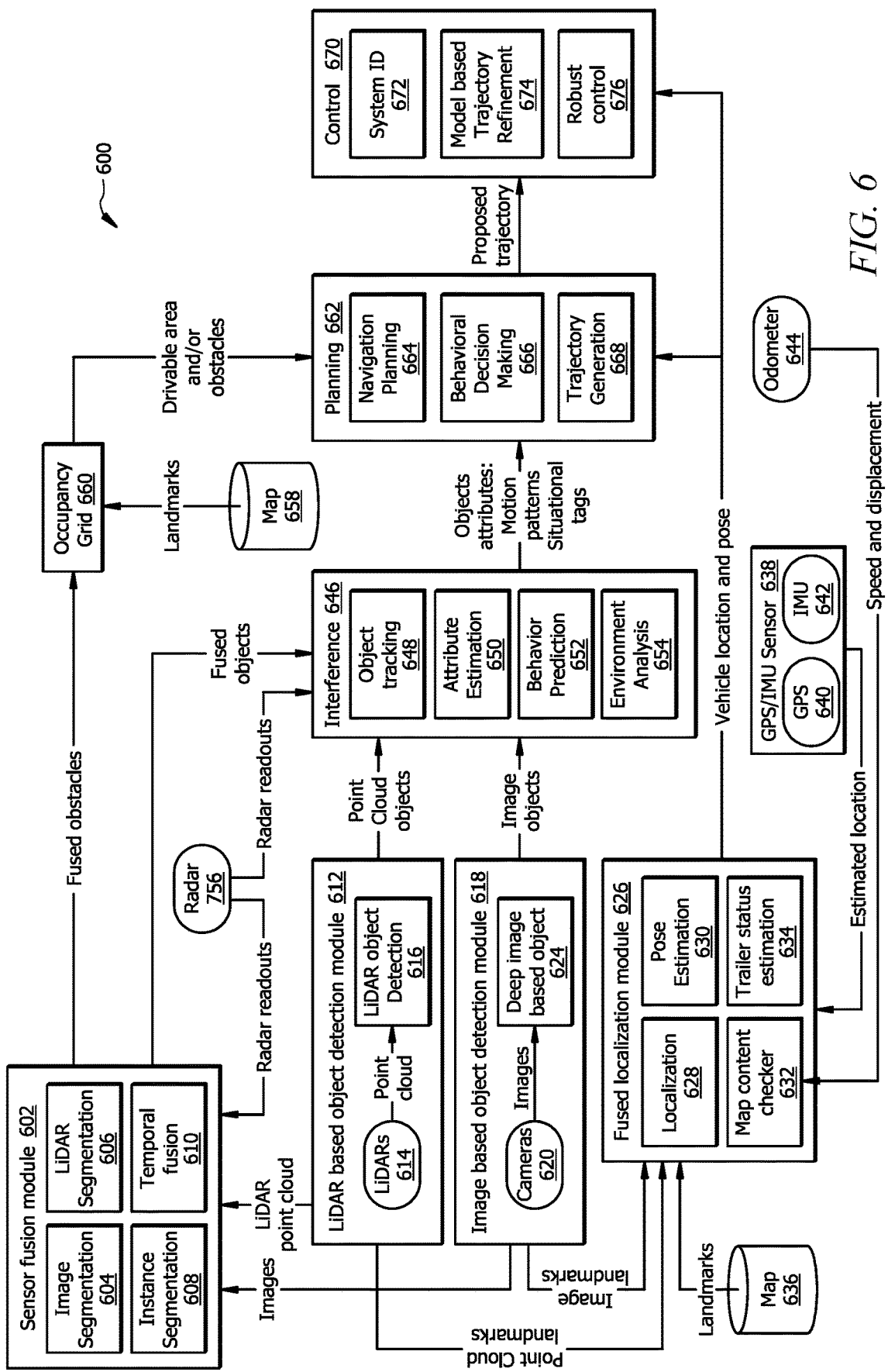
FIG. 6 is an example system for providing autonomous driving operations used by the AV of FIG. 5.
Figure 7:
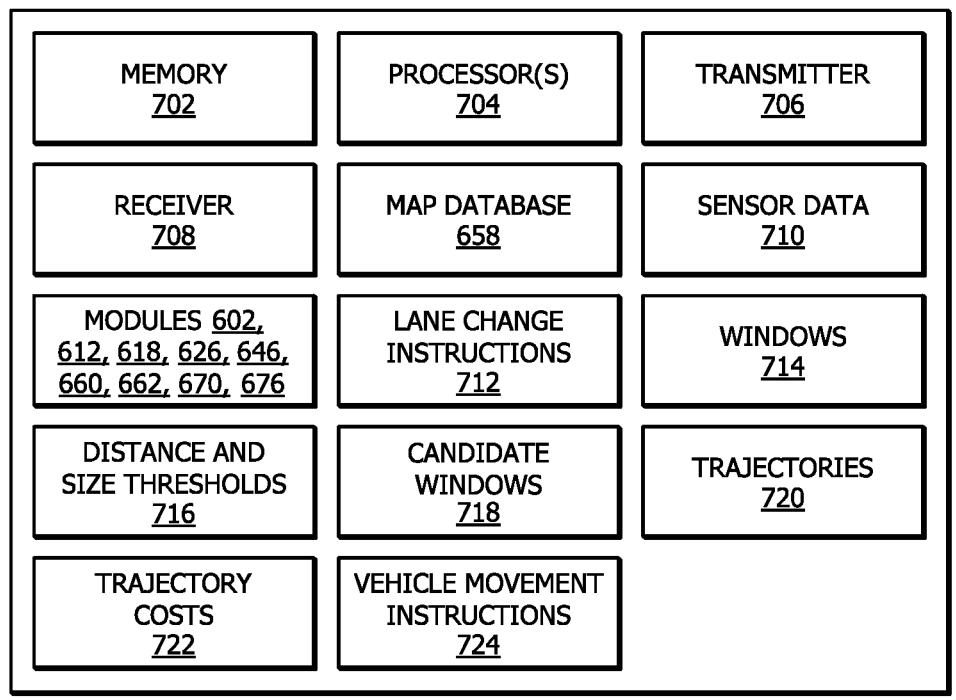
FIG. 7 is diagram of an AV control device of the AV of FIG. 5.

As described above, previous technology fails to provide efficient and reliable resources for directing an AV to proactively change lanes. This disclosure provides various systems, methods, and devices for improving the navigation of AVs to facilitate proactive lane change. FIG. 1 illustrates an AV traveling along a road and possible trajectories for proactive lane changes into different windows (e.g., physical spaces between pairs of vehicles) in the adjacent lane. FIGS. 2A-C and the corresponding description below illustrate the determination of the window into which the AV should proactively move to achieve a desired lane change. The window determination may be based on a "cost" of different possible trajectories for achieving the desired lane change. The cost may be selected to improve safety, limit wear and tear on the AV, reduce discomfort to any passengers in the AV, reduce stress on or shifting of items being transported by the AV, and the like. FIG. 3 illustrates an example of an AV proactively changing lanes in an example scenario in which current windows are too small to receive the AV. FIG. 4 illustrates an example process for proactive lane change of an AV. FIGS. 5-7 illustrate an example AV and various systems and devices for implementing autonomous driving operations by an AV, including the proactive lane change operations described in this disclosure. For example, FIG. 7 illustrates an example control device of the example AV shown in FIG. 5 for implementing the proactive lane change operations described in this disclosure.

Example AV Route and Terminal

FIG. 1 is a schematic diagram 100 illustrating an example lane change scenario for an AV 502 (see FIG. 5 and corresponding description below for further description of an example AV 502) and various trajectories 112, 116, 120, 124, 128, which may be considered and/or traveled by the AV 502 to move from a first lane 104 of the road 102 into a second lane 106. In the example of FIG. 1, the AV 502 is traveling along the first lane 104 of the road 102, and vehicles 108a-e are traveling in the second lane 106. The AV 502 has a sensor subsystem 544 and a control device 550, each of which are described in greater detail with respect to FIG. 5 below. The sensor subsystem 544 generally collects information (e.g., the sensor data 710 of FIG. 7) about the surroundings of the AV 502. The control device 550 may be a computer configured to implement the functions associated with proactive lane change described in this disclosure. The AV 502, sensor subsystem 544, and control device 550 are described in greater detail with respect to FIG. 5 below. The AV control device 550 is also described in greater detail below with respect to FIG. 7.

Upon determining that the AV 502 should change lanes (i.e., by moving from the first lane 104 to the second lane 106), the AV control device 550 may determine available windows 110a-d into which the AV 502 may move to achieve the desired lane change. The possible windows 110a-d are the physical spaces between pairs of vehicles 108a-e traveling in the second lane 106. The windows 110a-d may be determined based on information (e.g., sensor data 710 of FIG. 7) determined by the sensor subsystem 544 of the AV 502 (see FIG. 5 and corresponding description below). For example, the AV control device 550 may detect vehicles 108a-e and determine positions and sizes of the windows 110a-d based on the positions of the detected vehicles 108a-e. In this example, a first window 110a corresponds to the distance or between vehicle 108a and 108b, a second window 110b corresponds to the distance or space between vehicle 108b and 108c, a third window 110c corresponds to the distance or space between vehicle 108c and 108d, and a fourth window 110d corresponds to the distance or space between vehicle 108d and 108e.

In some embodiments, the control device 550 of the AV 502 may determine a subset of the possible windows 110a-d to include as candidate windows (e.g., candidate windows 718 of FIG. 7) into which the AV control device 550 may determine whether it is safe or appropriate to move. For example, the AV control device 550 may determine that one or more of the possible windows 110a-d is too far away from the AV 502 (e.g., greater than a threshold distance from the AV 502) and/or less than a threshold size compared to the sizes of the other available windows 110a-d. Narrowing all possible windows 110a-d to a smaller subset of candidate windows may improve the efficiency of proactive lane change by decreasing the number of possible lane change trajectories 112, 116, 120, 124, 128 that are considered by the AV control device 550 for proactive lane change.

In the example of FIG. 1, the AV control device 550 may determine that the first window 110a would require a movement 112 to position 114 which is greater than a threshold distance (e.g., a threshold 716 of FIG. 7) away from the AV 502. For example, trajectory 112 may result in an unsafe and/or uncomfortable acceleration of the AV 502, which should be avoided. As such, the first window 110a may be excluded from the set of candidate windows (e.g., the candidate windows 718 of FIG. 7, described in greater detail below). As another example, the AV control device 550 may determine that the other windows 110b-d are less than the threshold distance from the current position of the AV 502. These windows 110b-d may be included as candidate windows. In some embodiments, the AV control device 550 includes windows 110a-d with a relative size that is greater than a threshold size (e.g., a threshold 716 of FIG. 7) as candidate windows. For example, relative sizes of windows 110a-d may be determined as the ratio of the length of each window 110a-d to the length of the largest window 110a-d. In the example of FIG. 1, the smallest window 110d may be excluded from the candidate windows.

After determining the windows 110a-d and, optionally, candidate windows (e.g., candidate windows 718 of FIG. 7), the AV control device 550 determines into which window 110a-d the AV 502 should move. The AV control device 550 is generally configured to select a window 110a-d into which the AV 502 can move safely and comfortably (e.g., with decreased discomfort to passenger(s) and/or potential damage to items transported by the AV 502). For example, the AV control device 550 may compare a number of possible trajectories 112, 116, 120, 124, 128 for moving into the windows 110a-d, determine a cost of moving along the possible trajectories 112, 116, 120, 124, 128, and select the window 110a-d with the lowest-cost trajectory(ies) 112, 116, 120, 124, 128. As described in greater detail below, for example, with respect to FIGS. 2A-2B, the cost of a given trajectory 112, 116, 120, 124, 128 may be determined based on the position (s(t)), velocity (v(t)), and/or acceleration (a(t)) associated with the AV moving along the trajectory 112, 116, 120, 124, 128.

In some embodiments, the movement of the AV 502 from its current position to a position inside a selected window 110a-d (e.g., to position 122 or 130 illustrated in FIG. 1) may be evaluated in two or more portions. For example, a first portion of the movement may be the longitudinal movement along the current lane 104 of the AV 502 (e.g., trajectory 116 moving from the current position to a position 118 adjacent to window 110b). The AV control device 550 then evaluates a second trajectory portion 120 for movement both longitudinally and laterally into the adjacent lane 106 (e.g., from position 118 to position 122). Further details of trajectory 112, 116, 120, 124, 128 determination are provided with respect to the example operations described below and with respect to the tables of FIGS. 2A-C.

Once a window 110a-d is selected, the AV control device 550 causes the AV 502 to begin moving along the trajectory (ies) 112, 116, 120, 124, 128 for travel into the selected window 110a-d (e.g., by causing the AV 502 to accelerate or decelerate). For instance, if window 110b is selected for a lane change, the AV 502 may accelerate along trajectory 116 until reaching position 118, the AV 502 may then travel at the same velocity 132 of the window 110b before the AV 502 moves along trajectory 120 towards position 122 to change lanes. Movements (e.g., along trajectories 112, 116, 120, 124, 128) are depicted in FIG. 1 relative to movement of vehicles 108a-e. For example, a forward-pointing trajectory, such as trajectory 116, represents an acceleration of the AV 502 relative to the vehicles 108a-e, while a rear-facing trajectory, such as trajectory 124, represents a deceleration relative to the velocity of the vehicles 108a-e. Furthermore, positions 114, 118, 122, 126, 130 represent positions of the AV 502 while the AV 502 is moving (e.g., at the approximate velocity of the vehicles 108a-e or window velocity 132, as appropriate).

In an example operation of the AV 502 in the scenario of FIG. 1, the AV control device 550 determines that the AV 502 should move from the first lane 104 to the second lane 106. For example, a current route being traveled by the AV 502 may indicate that such a lane change is needed (e.g., within a period of time) in order for the AV 502 to maintain the desired route. As illustrated in the example of FIG. 1, vehicle 108c is located next to, or adjacent to, the AV 502, such that the lane change is not immediately possible. Instead, the AV 502 will need to either accelerate to position the AV 502 at an appropriate location to move into window 110a or 110b or decelerate to position the AV 502 at an appropriate position to move into window 110c or 110d.

In this example, the AV 502 determines a subset of the possible windows 110a-d to retain as candidate windows (e.g., candidate windows 718 of FIG. 7) into which the AV 502 may make the lane change. In this example, candidate windows 110b,c are retained as candidate windows because window 110a is greater than a threshold distance from the current position of the AV 502 and because the relative size of window 110d is less a predefined threshold value.

In order to determine into which candidate window 110b,c the AV 502 should move, the AV control device 550 may determine a number of possible trajectories for moving into the candidate window 110b,c. For example, a trajectory for changing lanes into window 110b may include a longitudinal movement trajectory portion 116 (e.g., accelerating the AV 502 to reach a position 118 appropriate for a lane change) and a lane-change movement portion 120 to move to position 122 in the candidate window 110b, while a trajectory for changing lanes into candidate window 110c may include a longitudinal movement trajectory portion 124 (e.g., decelerating the AV 502 to reach a position 126 appropriate for a lane change) and a lane-change movement portion 128 to move to position 130 in the candidate window 110c. A cost is determined for each trajectory (e.g., trajectories 116 and 120 and trajectories 124 and 128), as described in greater detail below with respect to FIGS. 2A and 2B. The cost generally reflects the safety of the trajectory (e.g., trajectories 116 and 120 and trajectories 124 and 128). For example, a lower cost trajectory may require less change in the position of the AV 502, a lower velocity (e.g., or change in velocity) of the AV 502, and/or a lower acceleration (e.g., or change in velocity) of the AV 502. The AV control device 550 then causes the AV 502 to begin moving along the trajectory with the lowest cost.

Further details of an example approach to selecting a window 110a-d for a proactive lane change are described with respect to FIGS. 2A-C. FIG. 2A is a table 200 showing examples of possible trajectories 204 and corresponding costs 206 associated moving the AV 502 longitudinally in a given transit time 202 along the current lane 104 of the road 102 from the current position to an initial lane-change position 118, 126 adjacent to the candidate window 110b,c. In other words, each of the trajectories 204 includes the movement information (e.g., position (s(t)), velocity (v(t)), and/or acceleration (a(t))) associated with moving the AV 502 from its current position to the lane change position 118, 126 in an amount of time 202. For example, the AV 502 would need a larger acceleration and velocity to achieve the change in position associated with trajectory portion 116 in a shorter time 202, such as T1, than a longer transit time 202, such as T3.

For each of the candidate windows 110b,c, the AV control device 550 may determine, for each transit time 202, a movement cost 206. As an example the movement cost 206 may be based on derivatives of one or more of a position (s(t)), velocity (v(t)), and/or acceleration (a(t)) associated with the AV 502 moving longitudinally along the current lane 104 from its current position to an initial, or lane-change, position 118, 126 adjacent to the candidate window 110b,c in the transit time 202. The AV control device 550 determines, for each candidate window 110b,c, a selected transit time 208 (shown as T3 in FIG. 2A) associated with the trajectory 204 with the lowest movement cost 206. The selected transit time 208 may correspond to the time within which the AV 502 will effectively catch up to the candidate window 110b,c. The trajectory 204 at the selected transit time 208 may correspond to the lowest-cost movements (e.g., characterized by position (s(t)), velocity (v(t)), and/or acceleration (a(t))) used to achieve the trajectories 116, 124 illustrated in FIG. 1. Movement costs 206 may be determined up to a predefined maximum transit time 202, TM, which may for example, be a time before which the AV 502 must change lanes to maintain a desired route.

In some embodiments, the selected transit time 208, may be determined by solving a minimization problem for an accumulated jerk (j(t)) (i.e., where jerk is the time derivative of acceleration) associated with the AV 502 moving longitudinally along the current lane 104 from its current position to the initial position 118, 126 adjacent to the candidate window 110b,c. For example, the AV control device 550 may solve the following optimization problem, for a number of possible transit times 202 (T):

$$\min \int_0^T j(t)^2 dt, \text{ such that } \dot{x} = \begin{bmatrix} v(t) \\ a(t) \\ j(t) \end{bmatrix} | t = 1, 2, \ldots, T$$

where x(t)=s(t)), (v(t)), (a(t)) and j(t)=ȧ. This optimization problem can be solved, for example, using Pontryagin's minimum principle. In an example of solving this optimization problem, functions (λ(t)) and H(t) are defined as:

$\lambda(t) = (\lambda_1(t), \lambda_2(t), \lambda_3(t))^T$ $H(x(t), j(t), \lambda(t)) = j(t)^2 \lambda_1(t) v(t) + \lambda_2(t) a(t) + \lambda_3(t) j(t)$ The conditions for optimal values of j, x, and λ (i.e., for j*, x*, and λ*) are:

$\nabla_j H(x^*(t), j^*(t), \lambda^*(t)) = 0$     (1)

$\dot{\lambda}^*(t) = -\nabla H(x^*(t), j(t), \lambda(t))$     (2)

From equation (2), the following differential equation can be determined:

$$\lambda^*(t) = \begin{bmatrix} 0 \\ -\lambda_1^*(t) \\ -\lambda_2^*(t) \end{bmatrix} \quad (3)$$

The solution to equation (3) is:

$$\lambda(t) = \begin{bmatrix} -2\alpha \\ 2\alpha t + 2\beta \\ -\alpha t^2 - 2\beta t - 2\gamma \end{bmatrix} \quad (4)$$

where $\alpha$, $\beta$, and $\gamma$ are constants, which may be determined as described below.

Combining equation (1) and equation (4) provides:

$$j^*(t) = -\tfrac{1}{2}\lambda_3^*(t) = \tfrac{1}{2}\alpha t^2 + \beta t + \gamma \quad (5)$$

The optimal x*(t) is determined from equation (5) and the appropriate initial conditions as:

$$x^*(t) = \begin{bmatrix} \frac{\alpha}{120}t^5 + \frac{\beta}{24}t^4 + \frac{\gamma}{6}t^3 + \frac{a_0}{2}t^2 + v_0 t + s_0 \\ \frac{\alpha}{24}t^4 + \frac{\beta}{6}t^3 + \frac{\gamma}{2}2 + a_0 T + v_0 \\ \frac{\alpha}{6}t^3 + \frac{\beta}{2}t^2 + \gamma t + a_0 \end{bmatrix} \quad (6)$$

Plugging the terminal state (x(T)=$s_T$, $v_T$, $a_T$) at transit time T) into equation (6) for provides:

$$\begin{bmatrix} \frac{T^3}{6} & \frac{T^2}{2} & T \\ \frac{T^4}{24} & \frac{T^3}{6} & \frac{T^2}{2} \\ \frac{T^5}{120} & \frac{T^4}{24} & \frac{T^3}{6} \end{bmatrix} \begin{bmatrix} \alpha \\ \beta \\ \gamma \end{bmatrix} = \begin{bmatrix} a_T - a_0 \\ v_T - v_0 - a_0 T \\ s_T - s_0 - v_0 T - \frac{1}{2} a_0 T^2 \end{bmatrix} \quad (7)$$

Values of $\alpha$, $\beta$, and $\gamma$ are determined from equation (7). The optimal value of is determined from equation (5) using these values of $\alpha$, $\beta$, and $\gamma$. The cost 206 may be determined by computing the value of $\int_0^T j(t)^2 dt$. This process may be repeated for a number of possible transit times 202 to determine the costs 206 for the different trajectories 204.

A similar process to that described above for determining the lowest cost first trajectory portion 116, 124 and an associated selected transit time 208 may be used to determine a preferred second trajectory portion 120, 128 for moving the AV 502 longitudinally and laterally from the initial position 118, 126 into the candidate window 110*b,c* in a second transit time 228. FIG. 2B shows a table 220 showing examples of possible trajectories 224 and corresponding lane-change costs 226 associated moving the AV 502 longitudinally and laterally in a given transit time 222 from the initial position 118, 126 into the candidate window 110*b,c*. In other words, each of the trajectories 224 includes the movement information (e.g., position (s(t)), velocity (v(t)), and/or acceleration (a(t))) associated with moving the AV 502 from the initial position 118, 126 to the final position 122, 130 in an amount of time 222. For example, the AV 502 would need a larger acceleration and velocity to achieve the change in position associated with trajectory portion 120 in a shorter time 222, such as T1, than a longer transit time 222, such as T3.

For each of the candidate windows 110*b,c*, the AV control device 550 may determine, for each transit time 222 following the selected transit time 208 described above for moving to the lane-change position 118, 126, a lane-change cost 226. As an example the lane-change cost 226 may be based on derivatives of one or more of a position (s(t)), velocity (v(t)), and/or acceleration (a(t)) associated with the AV 502 moving longitudinally and laterally from its initial position 118, 126 to a final position 122, 130 in the candidate window 110*b,c* in the transit time 222. For example, the selected transit time 228 may be determined by solving a minimization problem for an accumulated jerk, similarly to as described above with respect to the movement costs 206 of FIG. 2A. The AV control device 550 determines, for each candidate window 110*b,c*, a selected transit time 228 associated with the trajectory 224 with the lowest lane-change cost 226. This selected transit time 228 may correspond to the time within which the AV 502 will complete the lane change into the candidate window 110*b,c*. The trajectory 224 at the selected transit time 228 may correspond to the lowest-cost trajectory 120, 128 illustrated in FIG. 1.

Once the first trajectory portion 204 and second trajectory portion 224 with the lowest costs 206 and 226 are determined for each candidate window 110*b,c*, the AV control device 550 determines the candidate window 110*b, c* with the lowest overall cost, which may be based on (e.g., the sum of) the costs 206, 226 described above. FIG. 2C is a table 240 showing example trajectories 244 and costs 246 of various windows 242. The windows 242 may include the candidate windows 110*b,c* of FIG. 1. A trajectory 244 is generally a combination of the trajectories 204 and 224 at the selected transit times 208, 228 for each of the candidate windows 242. In other words, the trajectories 244 are based on (e.g., are a combination of) the lowest-cost trajectories 204, 224, described above with respect to FIGS. 2A and 2B. The overall cost 246 of each trajectory 244 may be the sum of the movement cost 206 and lane-change cost 226 of the trajectory portions 204, 224 of the trajectory 244. The AV control device 550 determines a selected window 248 as the window 242 with the lowest overall cost 246, as illustrated in table 240.

Returning to the example operation of the AV 502 of FIG. 1, the AV control device 550 may determine that the AV 502 should change lanes into candidate window 110*b*. For example, the cost 246 associated with the movement cost 206 of trajectory portion 116 and the lane-change cost 226 of trajectory portion 120 may less than the cost 246 of trajectories 124 and 124 for changing lanes into window 110*c*. The AV control device 550 then causes the AV 502 to accelerate to move along trajectory 116. In order to maintain the AV 502 at an initial lane-change positions 118, the AV control device 550 may determine a window velocity 132 of the candidate window 110*b* based on velocities of the two vehicles 108*b* and 108*c* traveling in the adjacent lane. For example, the AV control device 550 may determine an approximate velocity 132 of a center point of the window 110*b*. Once the AV 502 reaches the initial lane-change position 118, the AV control device causes the AV 502 to move at the window velocity 132. Once the AV control device 550 determines that the AV 502 can safely fit within the window 110*b* (e.g., that a size of the candidate window 110*b* is at least a threshold size (e.g., a threshold 716 of FIG. 7) for receiving the AV 502), the AV control device 550 causes the AV 502 to move into the candidate window 110*b* along trajectory 120.

FIG. 3 illustrates another example scenario of proactive lane change by an AV 502 in which each of the available windows 110a-d shown in FIG. 3 is less than a threshold size (e.g., a threshold 716 of FIG. 7) for receiving the AV 502. In other words, each of the windows 110a-d is too small for the AV 502 to fit within the window 110a-d. Previous autonomous driving technology would have required either (1) a driver of the AV 502 to take control of the AV 502 in order to change lanes or (2) the AV 502 to wait until a sufficiently large window 110a-d is available adjacent to the AV 502. These requirements are undesirable because they may result in a loss of full autonomous driving and/or possible delays in lane change, which may result in the AV 502 going off of its desired route. The AV control device 550 described in this disclosure overcomes these technical problems by facilitating proactive lane change even under the challenging scenario depicted in FIG. 3 when vehicles 108a-e are closely spaced. FIG. 3 shows diagrams 300, 320, 340 of movements and actions of the AV 502 at three different time points during an example proactive lane change by the AV 502. As in the example of FIG. 1, movements (e.g., along trajectories 304, 342) are depicted relative to movement of the other vehicles 108a-e (see FIG. 1 and corresponding description above). Furthermore, positions 306, 344 represent positions of the AV 502 while the AV 502 is moving (e.g., at the approximate velocity of the vehicles 108a-e).

At the initial time (T1) illustrated in diagram 300, the AV 502 (e.g., in response to determining a lane change is needed from lane 104 to lane 106) decelerates to move along trajectory 304 to reach position 306. In this example, the AV control device 550 has determined that the AV 502 should move into window 110d to achieve a safe proactive lane change (e.g., using any of the approaches described above with respect to FIGS. 1 and 2A-C or below with respect to FIG. 4). Position 306 is an initial position adjacent to the determined window 110d. The initial position 306 may correspond to a velocity that is approximately the same as the velocity of the window 110d (see, e.g., velocity 132 of FIG. 1). In this scenario a lane change movement is not immediately possible because the window 110d is too small to receive the AV 502. As such, the AV 550 may monitor the size of the window 110d for a period of time. In some cases, as illustrated in diagram 320, which depicts the AV 502 at position 306 after a period of time 308 (i.e., at subsequent time T2), the AV control device 550 may cause a turn signal 322 on a side of the AV 502 proximate the adjacent lane 106 to be activated. Activation of the turn signal 322 may aid in achieving a sufficient size of the window 110d for the AV 502 to move into the adjacent lane 106 (e.g., by communicating a desire for the vehicle 108e to provide space for the AV 502 to move into window 110d).

The AV control device 550 generally continues to monitor the size of the window 110d. At a further subsequent time (T3) illustrated in diagram 340 after a period of time 324, the AV control device 550 determines that the size of the window 110d meets or exceeds the threshold for receiving the AV 502. After determining that the size of the window 110d meets or exceeds the threshold, the AV control device 550 causes the AV 502 to change lanes by traveling along trajectory 342 to reach position 344.

Example Method of Proactive Lane Change

FIG. 4 illustrates an example method 400 of proactive lane change by an autonomous vehicle, such as the AV 502 illustrated in FIG. 5 and described in the corresponding description. The method 400 may begin at step 402 where the AV control device 550 determines that a lane change is needed. For example, the AV control device 550 may receive instructions (e.g., the lane change instructions 712 of FIG. 7) indicating that a lane change is needed. The instructions may include an indication of a target lane (e.g., the second lane 106 of FIGS. 1 and 3) and, optionally, a time deadline by which the AV 502 must be in the target lane in order to maintain the AV 502 on a desired path or route.

At step 404, the AV control device 550 determines available windows 110a-d in the adjacent lane 106. As an example, the windows 110a-d may be determined based on information (e.g., sensor data 710 of FIG. 7) determined by the sensor subsystem 544 of the AV 502 (see FIG. 5 and corresponding description below). For example, the AV control device 550 may detect vehicles 108a-e and determine the windows 110a-d based on the positions of the detected vehicles 108a-e.

At step 406, the AV control device 550 may determine a subset of the possible windows 110a-d that should be retained as candidate windows (e.g., the candidate windows 718 of FIG. 7) for the proactive lane change. For example, as described above with respect to FIG. 1, the AV control device 550 may determine that one or more of the possible windows 110a-d is too far away from the AV 502 (e.g., greater than a threshold distance from the AV 502) and/or less than a threshold size (e.g., a threshold 716 of FIG. 7) compared to the sizes of the available windows 110a-d. For instance, determining the subset of the windows 110a-d to include as candidate windows may involve determining the windows 110a-d that are less than a threshold distance from the current position of the AV 502 and including that the windows 110a-d that are less than the threshold distance from the current position of the AV 502 as candidate windows. In some cases, determining the determining the subset of the windows 110a-d to include as candidate windows involves determining relative sizes of the windows 110a-d (e.g., determining a ratio of the size of each window 110a-d to the size of the largest window 110a-d), determining windows 110a-d with relative sizes greater than a threshold value (e.g., a threshold 716 of FIG. 7), and including windows 110a-d with relative sizes greater than the threshold value as candidate windows.

At step 408, the AV control device 550 determines a lowest cost trajectory for movements (i.e., longitudinal acceleration or deceleration in the current lane 104 and lateral movement into the adjacent lane 106) needed to perform a proactive lane change by the AV 502 into each window 110a-d (e.g., or candidate window 718 of FIG. 7). For example, as described above with respect to FIGS. 2A-2C, the AV control device 550 may determine, for each window 110a-d, a number of possible trajectories 204, 224 (e.g., associated with performing movements in different times 202, 222), and trajectories 204, 224 may be determined for each window 110a-d with the lowest cost 246 based on the movement cost 206 and lane-change costs 226. Determining trajectories 204, 224, 244 and associated costs 206, 226, 246 is described in greater detail above with respect to FIGS. 2A-2C.

At step 410, the AV control device 550 determines the window 110a-d with the lowest cost 246 (e.g., the lowest overall cost 246, which may be based on the movement cost 206 and lane-change cost 226 shown in FIGS. 2A and 2B). The trajectory 224 for this window 110a-d becomes the selected trajectory along which the AV 502 will begin moving at step 412.

At step 412, the AV 502 begins moving along the trajectory for the window 110a-d determined at step 410. For example, the AV 502 may accelerate to move towards a window 110a-d in front of the AV 502 or decelerate to move towards a window 110*a-d* behind the AV 502. In order to cause such movement, the AV control device 550 may provide instructions (e.g., the vehicle movement instructions 724) to the vehicle drive subsystems 542 and vehicle control subsystems 546 associated with the AV 502 (see FIG. 5).

At step 414, the AV control device 550 determines if the AV 502 has reached a position adjacent to the window 110*a-d* determined at step 410. For example, if window 110*b* from FIG. 1 is selected at step 410, the AV control device 550 may determine whether the AV 502 has reached initial position 118 adjacent to window 110*b* of FIG. 1. The AV control device 550 may determine whether the AV 502 has reached the position adjacent to the determined window 110*a-d* using information from the sensor subsystem 544 (e.g., the sensor data 712 of FIG. 7). If the position (e.g., position 118 adjacent to window 110*b* of FIG. 1) has not been reached, the AV 502 continues to move along the determined trajectory at step 416. Once the AV 502 reaches the position adjacent to the determined window 110*a-d*, the AV control device 550 proceeds to step 418.

At step 418, the AV control device 550 may determine a window velocity 132 of the window 110*a-d* selected at step 410 and cause the AV 502 to move at the window velocity 132, as described above with respect to the example of FIG. 1. At step 420, the AV control device 550 determines if the size of the window 110*a-d* is at least a threshold size (e.g., a threshold 716 of FIG. 7) for receiving the AV 502. If the window 110*a-d* is not large enough to safely receive the AV 502, a turn signal 322 may be activated at step 422. The AV control device 550 may wait a period of time at step 424 before returning to step 420 to determine if the size of the window 110*a-d* is at least the threshold size for receiving the AV 502.

Once the size of the window 110*a-d* is at least the threshold size for receiving the AV 502, the AV control device 550 proceeds to step 426 and causes the AV 550 to change lanes by moving into the window 110*a-d* in the adjacent lane 106. For example, the AV control device 550 may provide instructions (e.g., the vehicle movement instructions 724) to the vehicle drive subsystems 542 and vehicle control subsystems 546 associated with the AV 502 (see FIG. 5) in order to cause the AV 502 to begin changing lanes (e.g., to perform the lane-change portion of the trajectory).

Example AV 502 and Its Operation

FIG. 5 shows a block diagram of an example vehicle ecosystem 500 in which autonomous driving operations can be determined. As shown in FIG. 5, the AV 502 may be a semi-trailer truck. The vehicle ecosystem 500 may include several systems and components that can generate and/or deliver one or more sources of information/data and related services to the AV control device 550 that may be located in the AV 502 or remotely from the AV 502. The AV control device 550 can be in data communication with a plurality of vehicle subsystems 540, all of which can be resident in the AV 502. A vehicle subsystem interface 560 is provided to facilitate data communication between the AV control device 550 and the plurality of vehicle subsystems 540. In some embodiments, the vehicle subsystem interface 560 can include a controller area network (CAN) controller to communicate with devices in the vehicle subsystems 540.

The AV 502 may include various vehicle subsystems that support operation of the AV 502. The vehicle subsystems may include a vehicle drive subsystem 542, a vehicle sensor subsystem 544, and/or a vehicle control subsystem 546. The components or devices of the vehicle drive subsystem 542, the vehicle sensor subsystem 544, and the vehicle control subsystem 546 shown in FIG. 5 are examples. The vehicle drive subsystem 542 may include components operable to provide powered motion for the AV 502. In an example embodiment, the vehicle drive subsystem 542 may include an engine or motor 542*a*, wheels/tires 542*b*, a transmission 542*c*, an electrical subsystem 542*d*, and a power source 542*e*.

The vehicle sensor subsystem 544 may include a number of sensors configured to sense information about an environment or condition of the AV 502. The vehicle sensor subsystem 544 may include one or more cameras 544*a* or image capture devices, a RADAR unit 544*b*, one or more temperature sensors 544*c*, a wireless communication unit 544*d* (e.g., a cellular communication transceiver), an inertial measurement unit (IMU) 544*e*, a laser range finder/LIDAR unit 544*f*, a Global Positioning System (GPS) transceiver 544*g*, and/or a wiper control system 544*h*. The vehicle sensor subsystem 544 may also include sensors configured to monitor internal systems of the AV 502 (e.g., an $O_2$ monitor, a fuel gauge, an engine oil temperature, etc.).

The IMU 544*e* may include any combination of sensors (e.g., accelerometers and gyroscopes) configured to sense position and orientation changes of the AV 502 based on inertial acceleration. The GPS transceiver 544*g* may be any sensor configured to estimate a geographic location of the AV 502. For this purpose, the GPS transceiver 544*g* may include a receiver/transmitter operable to provide information regarding the position of the AV 502 with respect to the Earth. The RADAR unit 544*b* may represent a system that utilizes radio signals to sense objects within the local environment of the AV 502. In some embodiments, in addition to sensing the objects, the RADAR unit 544*b* may additionally be configured to sense the speed and the heading of the objects proximate to the AV 502. The laser range finder or LIDAR unit 544*f* may be any sensor configured to sense objects in the environment in which the AV 502 is located using lasers. The cameras 544*a* may include one or more devices configured to capture a plurality of images of the environment of the AV 502. The cameras 544*a* may be still image cameras or motion video cameras.

The vehicle control subsystem 546 may be configured to control operation of the AV 502 and its components. Accordingly, the vehicle control subsystem 546 may include various elements such as a throttle and gear selector 546*a*, a brake unit 546*b*, a navigation unit 546*c*, a steering system 546*d*, and/or an autonomous control unit 546*e*. The throttle 546*a* may be configured to control, for instance, the operating speed of the engine and, in turn, control the speed of the AV 502. The gear selector 546*a* may be configured to control the gear selection of the transmission. The brake unit 546*b* can include any combination of mechanisms configured to decelerate the AV 502. The brake unit 546*b* can use friction to slow the wheels in a standard manner. The brake unit 546*b* may include an Anti-lock brake system (ABS) that can prevent the brakes from locking up when the brakes are applied. The navigation unit 546*c* may be any system configured to determine a driving path or route for the AV 502. The navigation 546*c* unit may additionally be configured to update the driving path dynamically while the AV 502 is in operation. In some embodiments, the navigation unit 546*c* may be configured to incorporate data from the GPS transceiver 544*g* and one or more predetermined maps so as to determine the driving path or route for the AV 502. The steering system 546*d* may represent any combination of mechanisms that may be operable to adjust the heading of AV 502 in an autonomous mode or in a driver-controlled mode.

The autonomous control unit 546e may represent a control system configured to identify, evaluate, and avoid or otherwise negotiate potential obstacles or obstructions in the environment of the AV 502. In general, the autonomous control unit 546e may be configured to control the AV 502 for operation without a driver or to provide driver assistance in controlling the AV 502. In some embodiments, the autonomous control unit 546e may be configured to incorporate data from the GPS transceiver 544g, the RADAR 544b, the LIDAR unit 544f, the cameras 544a, and/or other vehicle subsystems to determine the driving path or trajectory for the AV 502.

Many or all of the functions of the AV 502 can be controlled by the AV control device 550. The AV control device 550 may include at least one data processor 570 (which can include at least one microprocessor) that executes processing instructions 580 stored in a non-transitory computer readable medium, such as the data storage device 590 or memory. The AV control device 550 may also represent a plurality of computing devices that may serve to control individual components or subsystems of the AV 502 in a distributed fashion. In some embodiments, the data storage device 590 may contain processing instructions 580 (e.g., program logic) executable by the data processor 570 to perform various methods and/or functions of the AV 502, including those described with respect to FIGS. 1-4 above and FIGS. 6-7 below.

The data storage device 590 may contain additional instructions as well, including instructions to transmit data to, receive data from, interact with, or control one or more of the vehicle drive subsystem 542, the vehicle sensor subsystem 544, and the vehicle control subsystem 546. The AV control device 550 can be configured to include a data processor 570 and a data storage device 590. The AV control device 550 may control the function of the AV 502 based on inputs received from various vehicle subsystems (e.g., the vehicle drive subsystem 542, the vehicle sensor subsystem 544, and the vehicle control subsystem 546).

FIG. 6 shows an exemplary system 600 for providing precise autonomous driving operations. The system 600 includes several modules that can operate in the AV control device 550, as described in FIG. 5. The AV control device 550 includes a sensor fusion module 602 shown in the top left corner of FIG. 6, where the sensor fusion module 602 may perform at least four image or signal processing operations. The sensor fusion module 602 can obtain images from cameras located on an autonomous vehicle to perform image segmentation 604 to detect the presence of moving objects (e.g., other vehicles, pedestrians, etc.,) and/or static obstacles (e.g., stop sign, speed bump, terrain, etc.,) located around the autonomous vehicle. The sensor fusion module 602 can obtain LiDAR point cloud data item from LiDAR sensors located on the autonomous vehicle to perform LiDAR segmentation 606 to detect the presence of objects and/or obstacles located around the autonomous vehicle.

The sensor fusion module 602 can perform instance segmentation 608 on image and/or point cloud data item to identify an outline (e.g., boxes) around the objects and/or obstacles located around the autonomous vehicle. The sensor fusion module 602 can perform temporal fusion 610 where objects and/or obstacles from one image and/or one frame of point cloud data item are correlated with or associated with objects and/or obstacles from one or more images or frames subsequently received in time.

The sensor fusion module 602 can fuse the objects and/or obstacles from the images obtained from the camera and/or point cloud data item obtained from the LiDAR sensors. For example, the sensor fusion module 602 may determine based on a location of two cameras that an image from one of the cameras comprising one half of a vehicle located in front of the autonomous vehicle is the same as the vehicle located captured by another camera. The sensor fusion module 602 sends the fused object information to the inference module 646 and the fused obstacle information to the occupancy grid module 660. The AV control device 550 includes the occupancy grid module 660 can retrieve landmarks from a map database 658 stored in the AV control device 550. The occupancy grid module 660 can determine drivable area and/or obstacles from the fused obstacles obtained from the sensor fusion module 602 and the landmarks stored in the map database 658. For example, the occupancy grid module 660 can determine that a drivable area may include a speed bump obstacle.

As illustrated in FIG. 6, below the sensor fusion module 602, the AV control device 550 includes a LiDAR based object detection module 612 that can perform object detection 616 based on point cloud data item obtained from the LiDAR sensors 614 located on the autonomous vehicle. The object detection 616 technique can provide a location (e.g., in 3D world coordinates) of objects from the point cloud data item. Below the LiDAR based object detection module 612, the AV control device 550 includes an image based object detection module 618 that can perform object detection 624 based on images obtained from cameras 620 located on the autonomous vehicle. The object detection 624 technique can employ a deep machine learning technique to provide a location (e.g., in 3D world coordinates) of objects from the image provided by the camera.

The RADAR 756 on the autonomous vehicle can scan an area in front of the autonomous vehicle or an area towards which the autonomous vehicle is driven. The Radar data is sent to the sensor fusion module 602 that can use the Radar data to correlate the objects and/or obstacles detected by the RADAR with the objects and/or obstacles detected from both the LiDAR point cloud data item and the camera image. The Radar data is also sent to the inference module 646 that can perform data processing on the radar data to track objects 648 as further described below.

The AV control device 550 includes an inference module 646 that receives the locations of the objects from the point cloud and the objects from the image, and the fused objects from the sensor fusion module 602. The inference module 646 also receive the Radar data with which the inference module 646 can track objects 648 from one point cloud data item and one image obtained at one time instance to another (or the next) point cloud data item and another image obtained at another subsequent time instance.

The inference module 646 may perform object attribute estimation 650 to estimate one or more attributes of an object detected in an image or point cloud data item. The one or more attributes of the object may include a type of object (e.g., pedestrian, car, or truck, etc.). The inference module 646 may perform environment analysis 654 to identify properties of the environment of the AV 502. The inference module 646 may perform behavior prediction 652 to estimate or predict motion pattern of an object detected in an image and/or a point cloud. The behavior prediction 652 can be performed to detect a location of an object in a set of images received at different points in time (e.g., sequential images) or in a set of point cloud data item received at different points in time (e.g., sequential point cloud data items). In some embodiments the behavior prediction 652 can be performed for each image received from a camera and/or each point cloud data item received from the LiDAR sensor. In some embodiments, the inference module 646 can be performed to reduce computational load by performing behavior prediction 652 on every other or after every pre-determined number of images received from a camera or point cloud data item received from the LiDAR sensor (e.g., after every two images or after every three point cloud data items).

The behavior prediction 652 feature may determine the speed and direction of the objects that surround the autonomous vehicle from the Radar data, where the speed and direction information can be used to predict or determine motion patterns of objects. A motion pattern may comprise a predicted trajectory information of an object over a pre-determined length of time in the future after an image is received from a camera. Based on the motion pattern predicted, the inference module 646 may assign motion pattern situational tags to the objects (e.g., "located at coordinates (x,y)," "stopped," "driving at 50 mph," "speeding up" or "slowing down"). The situation tags can describe the motion pattern of the object. The inference module 646 sends the one or more object attributes (e.g., types of the objects) and motion pattern situational tags to the planning module 662.

The AV control device 550 includes the planning module 662 that receives the object attributes and motion pattern situational tags from the inference module 646, the drivable area and/or obstacles, and the vehicle location and pose information from the fused localization module 626 (further described below).

The planning module 662 can perform navigation planning 664 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 664 may include determining an area next to the road where the autonomous vehicle can be safely parked in case of emergencies. The planning module 662 may include behavioral decision making 666 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 662 performs trajectory generation 668 and selects a trajectory from the set of trajectories determined by the navigation planning operation 664. The selected trajectory information is sent by the planning module 662 to the control module 670.

The AV control device 550 includes a control module 670 that receives the proposed trajectory from the planning module 662 and the autonomous vehicle location and pose from the fused localization module 626. The control module 670 includes a system identifier 672. The control module 670 can perform a model based trajectory refinement 674 to refine the proposed trajectory. For example, the control module 670 can applying a filtering (e.g., Kalman filter) to make the proposed trajectory data smooth and/or to minimize noise. The control module 670 may perform the robust control 676 by determining, based on the refined proposed trajectory information and current location and/or pose of the autonomous vehicle, an amount of brake pressure to apply, a steering angle, a throttle amount to control the speed of the vehicle, and/or a transmission gear. The control module 670 can send the determined brake pressure, steering angle, throttle amount, and/or transmission gear to one or more devices in the autonomous vehicle to control and facilitate precise driving operations of the autonomous vehicle.

The deep image-based object detection 624 performed by the image based object detection module 618 can also be used detect landmarks (e.g., stop signs, speed bumps, etc.,) on the road. The AV control device 550 includes a fused localization module 626 that obtains landmarks detected from images, the landmarks obtained from a map database 636 stored on the AV control device 550, the landmarks detected from the point cloud data item by the LiDAR based object detection module 612, the speed and displacement from the odometer sensor 644 and the estimated location of the autonomous vehicle from the GPS/IMU sensor 638, which may include a GPS sensor 640 and/or an IMU sensor 642, located on or in the autonomous vehicle. Based on this information, the fused localization module 626 can perform a localization operation 628 to determine a location of the autonomous vehicle, which can be sent to the planning module 662 and the control module 670.

The fused localization module 626 can estimate pose 630 of the autonomous vehicle based on the GPS and/or IMU sensors 638. The pose of the autonomous vehicle can be sent to the planning module 662 and the control module 670. The fused localization module 626 can also estimate status 634 (e.g., location, possible angle of movement) of the trailer unit based on, for example, the information provided by the IMU sensor 642 (e.g., angular rate and/or linear velocity). The fused localization module 626 may also check the map content 632.

FIG. 7 shows an exemplary block diagram of an AV control device 550 included in an autonomous AV 502. The AV control device 550 includes at least one processor 704 and a memory 702 having instructions stored thereupon. The processor 704 comprises one or more processors operably coupled to the memory 702. The processor 704 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 704 may be a programmable logic device, a microcontroller, a microprocessor, or any suitable combination of the preceding. The processor 704 is communicatively coupled to and in signal communication with the memory 702 and the transmitter 706. The one or more processors are configured to process data and may be implemented in hardware or software. For example, the processor 704 may be 8-bit, 16-bit, 32-bit, 64-bit or of any other suitable architecture. The processor 704 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-6. In some embodiments, the function described herein is implemented using logic units, FPGAs, ASICs, DSPs, or any other suitable hardware or electronic circuitry.

The memory 702 is operable to store any of the information described above with respect to FIGS. 1-4 along with any other data, instructions, logic, rules, or code operable to implement the function(s) described herein when executed by processor 704. The memory may store the various modules 602, 612, 618, 626, 646, 660, 662, 670, 676 and the map database 658 described above with respect to FIG. 6. The memory may also store sensor data 710, lane change instructions 712, windows 714, thresholds 716, candidate windows 718, trajectories 720, trajectory costs 722, and vehicle movement instructions 724. The sensor data 710 generally includes any information obtained or generated by the sensor subsystem 544 associated with the AV 502 (see FIG. 5). The lane change instructions 712 generally include any instructions indicating that the AV 502 should change lanes. The lane change instructions 712 may include an indication of a target lane (e.g., the second lane 106 of FIGS. 1 and 3) and, optionally, a time deadline by which the AV 502 must be in the target lane in order to maintain the AV 502 on a desired route. The windows 714 generally include any of the windows 110a-d described above with respect to FIGS. 1 and 3. The thresholds 716 include any threshold values (e.g., distances, sizes, etc.) employed by the AV control device 550, for example, to determine candidate windows 718. The candidate windows 718 include a subset of available windows 714. The trajectories 720 generally include the trajectories 112, 116, 120, 124, 128, 204, 224, 244, described above, which include information to describe movements (e.g., positions, velocities, and accelerations) the AV 502 may perform to achieve a given lane change. The trajectory costs 722 refer to the various costs 206, 226, 246 described above with respect to FIGS. 1 and 2A-C. The vehicle movement instructions 724 include information provided by the AV control device 550 to the vehicle drive subsystems 542 and vehicle control subsystems 546 to move along a selected trajectory 720.

The memory 702 comprises one or more disks, tape drives, or solid-state drives, and may be used as an over-flow data storage device, to store programs when such programs are selected for execution, and to store instructions and data that are read during program execution. The memory 702 may be volatile or non-volatile and may comprise read-only memory (ROM), random-access memory (RAM), ternary content-addressable memory (TCAM), dynamic random-access memory (DRAM), and static random-access memory (SRAM).

The transmitter 706 transmits or sends information or data to one or more devices in the autonomous vehicle. For example, a transmitter 706 can send an instruction to one or more motors of the steering wheel to steer the autonomous vehicle. The receiver 708 receives information or data transmitted or sent by one or more devices. For example, the receiver 708 receives a status of the current speed from the odometer sensor or the current transmission gear from the transmission.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system, comprising:
an autonomous vehicle (AV) configured to travel along a road;
a control device communicatively coupled to the AV, the control device comprising at least one processor configured to:
determine that the AV should move from a current lane of the road to an adjacent lane of the road;
determine two or more candidate windows into which the AV may move in the adjacent lane, wherein each candidate window corresponds to a physical space in the adjacent lane between two vehicles traveling in the adjacent lane;
determine that the AV should move into a first candidate window; and
in response to determining that the AV should move into the first candidate window, cause the AV to change speed.

Clause 2. The system of Clause 1, wherein:
the first candidate window is located in front of the AV;
causing the AV to change speed comprises causing the AV to accelerate; and
the processor is further configured to, after causing the AV to accelerate:
determine a window velocity of the first candidate window based on velocities of the two vehicles traveling in the adjacent lane;
cause the AV to move at the window velocity of the first candidate window, after the AV reaches a position adjacent to the first candidate window;
determine that a size of the first candidate window meets or exceeds a threshold size for receiving the AV; and
after determining that the size of the first candidate window meets or exceeds the threshold size for receiving the AV, cause the AV to move into the first candidate window.

Clause 3. The system of Clause 1, wherein:
the first candidate window is located behind the AV; and
the processor is further configured to cause the AV to begin moving along the first trajectory by causing the AV to decelerate.

Clause 4. The system of Clause 1, wherein the processor is further configured to:
determine that the AV should move into a second candidate window located behind the AV;

in response to determining that the AV should move into the second candidate window located behind the AV, cause the AV to decelerate;

determine a window velocity of the second candidate window based on velocities of the two vehicles traveling in the adjacent lane;

cause the AV to move at the window velocity of the second candidate window upon reaching a position adjacent to the second candidate window;

determine that a size of the second candidate window meets or exceeds a threshold size for receiving the AV; and after determining that the size of the second candidate window meets or exceeds the threshold size for receiving the AV, cause the AV to move into the second candidate window.

Clause 5. The system of Clause 1, wherein the processor is further configured to determine that the AV should move into the first candidate window by:

determining, for each candidate window, a corresponding trajectory for moving the AV from a current position to a final position within the candidate window;

determining, for each trajectory, a cost associated with moving the AV along the trajectory; and determining that a first cost of moving the AV along a first trajectory into the first candidate window is less than a second cost of moving the AV along a second trajectory into a second candidate window.

Clause 6. The system of Clause 5, wherein the processor is further configured to determining, for each trajectory, the cost associated with moving the AV along the trajectory using one or more of a position, velocity, and acceleration associated with the AV moving along the trajectory.

Clause 7. A device communicatively coupled to an autonomous vehicle (AV) configured to travel along a road, the device comprising at least one processor configured to:

determine that the AV should move from a current lane of the road to an adjacent lane of the road;

determine two or more candidate windows into which the AV may move in the adjacent lane, wherein each candidate window corresponds to a physical space in the adjacent lane between two vehicles traveling in the adjacent lane;

determine, for each candidate window, a corresponding trajectory for moving the AV from a current position to a final position within the candidate window;

determine, for each trajectory, a cost associated with moving the AV along the trajectory;

determine that a first cost of moving the AV along a first trajectory into a first candidate window is less than a second cost of moving the AV along a second trajectory into a second candidate window; and in response to determining that the first cost of moving the AV along the first trajectory is less than the second cost, cause the AV to begin moving along the first trajectory.

Clause 8. The device of Clause 7, wherein:

a size of the first candidate window is less than a threshold size for receiving the AV; and the processor is further configured to, after causing the AV to begin moving along the first trajectory:

cause the AV to move to an initial position in the current lane adjacent to the first candidate window;

monitor the size of the first candidate window; and after monitoring the size of the first candidate window for a period of time, determine that the size of the first candidate window meets or exceeds a threshold size for receiving the AV; and after determining that the size of the first candidate window meets or exceeds the threshold size for receiving the AV, cause the AV to change lanes by moving into a portion of the first candidate window.

Clause 9. The device of Clause 8, wherein the processor is further configured to, prior to determining that the size of the first candidate window meets or exceeds the threshold size for receiving the AV, cause the AV to activate a turn signal on a side of the AV proximate the adjacent lane of the first candidate window.

Clause 10. The device of Clause 1, wherein the processor is further configured to determine, for each candidate window, the corresponding trajectory by:

determining a first trajectory portion associated with the AV moving longitudinally along the current lane of the road from the current position to an initial position adjacent to the candidate window; and determining a second trajectory portion associated with the AV moving longitudinally and laterally from the initial position into the candidate window.

Clause 11. The device of Clause 10, wherein determining the first trajectory portion comprises:

determining, for each of a plurality of first transit times, a movement cost based on derivatives of one or more of a position, velocity, and acceleration associated with the AV moving longitudinally along the current lane of the road from the current position to the initial position adjacent to the candidate window in the first transit time.

determining a selected first transit time with the lowest movement cost;

determining the first trajectory portion corresponding to a set of positions, velocities, and accelerations associated with the AV moving longitudinally along the current lane of the road from the current position to the initial position adjacent to the candidate window in the selected first transit time.

Clause 12. The device of Clause 11, wherein determining the selected first transit time with the lowest movement cost comprises solving a minimization problem for an accumulated jerk associated with the AV moving longitudinally along the current lane of the road from the current position to the initial position adjacent to the candidate window in the plurality of first transit times.

Clause 13. The device of Clause 11, wherein determining the second trajectory portion comprises:

determining, for each of a plurality of second transit times after the selected first transit time, a lane-change cost based on derivatives of one or more of a position, velocity, and acceleration associated with the AV moving longitudinally and laterally from the initial position into the candidate window in the selected second transit time in the second transit time;

determining a selected second transit time with the lowest lane-change cost; determining the second trajectory portion corresponding to a set of positions, velocities, and accelerations associated with the AV moving longitudinally and laterally from the initial position into the candidate window in the selected second transit time.

Clause 14. The device of Clause 13, wherein the processor is further configured to determine, for each trajectory, the cost associated with moving the AV along the trajectory based on a cumulative cost of the first trajectory portion and second trajectory portion of the trajectory, wherein the cumulative cost is determined based on one or more of positions, velocities, and accelerations of the AV moving along the first trajectory portion and the second trajectory portion for the trajectory.

Clause 15. A method comprising, by a processor of a control device communicatively coupled to an autonomous vehicle (AV) configured to travel along a road:
  determining that the AV should move from a current lane of the road to an adjacent lane of the road;
  determining two or more candidate windows into which the AV may move in the adjacent lane, wherein each candidate window corresponds to a physical space in the adjacent lane between two vehicles traveling in the adjacent lane;
  determining that the AV should move into a first candidate window located in front of the AV; and
  in response to determining that the AV should move into the first candidate window located in front of the AV, causing the AV to accelerate.

Clause 16. The method of Clause 15, the method further comprising:
  determining that the AV should move into a second candidate window located behind the AV; and
  in response to determining that the AV should move into the second candidate window located behind the AV, causing the AV to decelerate.

Clause 17. The method of Clause 15, wherein determining the candidate windows comprises:
  determining available windows between pairs of vehicles moving in the adjacent lane, wherein the available windows correspond to physical spaces between the pairs of vehicles moving in the adjacent lane; and
  determining, based on one or both of sizes of the windows and a distance of the windows from the current position of the AV, a subset of the set of windows to include as the candidate windows.

Clause 18. The method of Clause 17, wherein determining the subset of the windows comprises:
  determining the windows that are less than a threshold distance from the current position of the AV; and
  including the determined windows that are less than the threshold distance from the current position of the AV in the subset of the windows as the candidate windows.

Clause 19. The method of Clause 17, wherein determining the subset of the windows comprises:
  determining relative sizes of the windows;
  determining windows with relative sizes greater than a threshold value; and
  including the determined windows in the subset of the windows as candidate windows.

Clause 20. The method of Clause 19, wherein determining the relative sizes of the windows comprises:
  determining a first size of a largest window of the windows; and
  determining, for each window, the relative size as a ratio of the size of the window to the first size.

What is claimed is:

1. A system, comprising:
  an autonomous vehicle configured to travel along a road;
  a control device communicatively coupled to the autonomous vehicle, the control device comprising at least one processor configured to:
    determine that the autonomous vehicle should move from a current lane of the road to an adjacent lane of the road;
    determine two or more candidate windows into which the autonomous vehicle may move in the adjacent lane, wherein each candidate window corresponds to a physical space in the adjacent lane between two vehicles traveling in the adjacent lane;
    determine, for each candidate window, a corresponding trajectory for moving the autonomous vehicle from a current position to a final position within the candidate window, wherein the at least one processor is configured to determine, for each candidate window, the corresponding trajectory by:
      determining a first trajectory portion associated with the autonomous vehicle moving longitudinally along the current lane of the road from the current position to an initial position adjacent to the candidate window, wherein the determining the first trajectory portion comprises:
        determining, for each transit time of a plurality of third transit times, a movement cost based on derivatives of one or more of a position, velocity, or acceleration associated with the autonomous vehicle moving longitudinally along the current lane of the road from the current position to the initial position adjacent to the candidate window in the transit time of the plurality of third transit times;
        determining a selected first transit time with the lowest movement cost; and
        determining the first trajectory portion corresponding to a set of positions, velocities, and accelerations associated with the autonomous vehicle moving longitudinally along the current lane of the road from the current position to the initial position adjacent to the candidate window in the selected first transit time; and
      determining a second trajectory portion associated with the autonomous vehicle moving longitudinally and laterally from the initial position into the candidate window;
    determine, for each trajectory, a cost associated with moving the autonomous vehicle along the trajectory;
    determine that a first cost of moving the autonomous vehicle along a first trajectory into a first candidate window is less than a second cost of moving the autonomous vehicle along a second trajectory into a second candidate window;
    determine a first transit time that corresponds to a time within which the autonomous vehicle can move to the adjacent lane in the first candidate window;
    determine a second transit time that corresponds to a time within which the autonomous vehicle can move to the adjacent lane in the second candidate window;
    determine that a ratio of a size of a third candidate window with respect to the first candidate window is less than a threshold ratio;
    exclude the third candidate window from the two or more candidate windows in response to that the ratio of the size of the third candidate window with respect to the first candidate window is less than the threshold ratio;
    determine that the first transmit time leads to a smaller change in velocity and a smaller change in position of the autonomous vehicle than the second transit time;
    determine that the autonomous vehicle should move into the adjacent lane in the first candidate window in response to determining that the first transmit time leads to a smaller change in velocity and a smaller change in position of the autonomous vehicle than the second transit time;

in response to determining that the autonomous vehicle should move into the first candidate window, cause the autonomous vehicle to change speed; and in response to determining that the first cost of moving the autonomous vehicle along the first trajectory is less than the second cost and that the first transmit time leads to a smaller change in velocity and a smaller change in position of the autonomous vehicle than the second transit time, cause the autonomous vehicle to begin moving along the first trajectory.

2. The system of claim 1, wherein:

the first candidate window is located in front of the autonomous vehicle;

causing the autonomous vehicle to change speed comprises causing the autonomous vehicle to accelerate; and the processor is further configured to, after causing the autonomous vehicle to accelerate:

determine a window velocity of the first candidate window based on velocities of the two vehicles traveling in the adjacent lane;

cause the autonomous vehicle to move at the window velocity of the first candidate window, after the autonomous vehicle reaches a position adjacent to the first candidate window;

determine that a size of the first candidate window meets or exceeds a threshold size for receiving the autonomous vehicle; and after determining that the size of the first candidate window meets or exceeds the threshold size for receiving the autonomous vehicle, cause the autonomous vehicle to move into the first candidate window.

3. The system of claim 1, wherein:

the first candidate window is located behind the autonomous vehicle; and the processor is further configured to cause the autonomous vehicle to begin moving along the first trajectory by causing the autonomous vehicle to decelerate.

4. The system of claim 1, wherein the second candidate window is located behind the autonomous vehicle, and the processor is further configured to:

determine that the autonomous vehicle should move into the second candidate window located behind the autonomous vehicle;

in response to determining that the autonomous vehicle should move into the second candidate window located behind the autonomous vehicle, cause the autonomous vehicle to decelerate;

determine a window velocity of the second candidate window based on velocities of the two vehicles traveling in the adjacent lane;

cause the autonomous vehicle to move at the window velocity of the second candidate window upon reaching a position adjacent to the second candidate window;

determine that a size of the second candidate window meets or exceeds a threshold size for receiving the autonomous vehicle; and after determining that the size of the second candidate window meets or exceeds the threshold size for receiving the autonomous vehicle, cause the autonomous vehicle to move into the second candidate window.

5. The system of claim 1, wherein the processor is further configured to determine, for each trajectory, the cost associated with moving the autonomous vehicle along the trajectory using one or more of a position, velocity, or acceleration associated with the autonomous vehicle moving along the trajectory.

6. A device communicatively coupled to an autonomous vehicle configured to travel along a road, the device comprising at least one processor configured to:

determine that the autonomous vehicle should move from a current lane of the road to an adjacent lane of the road;

determine two or more candidate windows into which the autonomous vehicle may move in the adjacent lane, wherein each candidate window corresponds to a physical space in the adjacent lane between two vehicles traveling in the adjacent lane;

determine, for each candidate window, a corresponding trajectory for moving the autonomous vehicle from a current position to a final position within the candidate window, wherein the at least one processor is configured to determine, for each candidate window, the corresponding trajectory by:

determining a first trajectory portion associated with the autonomous vehicle moving longitudinally along the current lane of the road from the current position to an initial position adjacent to the candidate window, wherein the determining the first trajectory portion comprises:

determining, for each transit time of a plurality of third transit times, a movement cost based on derivatives of one or more of a position, velocity, or acceleration associated with the autonomous vehicle moving longitudinally along the current lane of the road from the current position to the initial position adjacent to the candidate window in the transit time of the plurality of third transit times;

determining a selected first transit time with the lowest movement cost; and determining the first trajectory portion corresponding to a set of positions, velocities, and accelerations associated with the autonomous vehicle moving longitudinally along the current lane of the road from the current position to the initial position adjacent to the candidate window in the selected first transit time; and determining a second trajectory portion associated with the autonomous vehicle moving longitudinally and laterally from the initial position into the candidate window;

determine, for each trajectory, a cost associated with moving the autonomous vehicle along the trajectory;

determine that a first cost of moving the autonomous vehicle along a first trajectory into a first candidate window is less than a second cost of moving the autonomous vehicle along a second trajectory into a second candidate window;

determine a first transit time that corresponds to a time within which the autonomous vehicle can move to the adjacent lane in the first candidate window;

determine a second transit time that corresponds to a time within which the autonomous vehicle can move to the adjacent lane in the second candidate window;

determine that a ratio of a size of a third candidate window with respect to the first candidate window is less than a threshold ratio;

exclude the third candidate window from the two or more candidate windows in response to that the ratio of the size of the third candidate window with respect to the first candidate window is less than the threshold ratio;

determine that the first transmit time leads to a smaller change in velocity and a smaller change in position of the autonomous vehicle than the second transit time; and in response to determining that the first cost of moving the autonomous vehicle along the first trajectory is less than the second cost and that the first transmit time leads to a smaller change in velocity and a smaller change in position of the autonomous vehicle than the second transit time, cause the autonomous vehicle to begin moving along the first trajectory.

7. The device of claim 6, wherein:

a size of the first candidate window is less than a threshold size for receiving the autonomous vehicle; and the at least one processor is further configured to, after causing the autonomous vehicle to begin moving along the first trajectory:

cause the autonomous vehicle to move to an initial position in the current lane adjacent to the first candidate window;

monitor the size of the first candidate window; and after monitoring the size of the first candidate window for a period of time, determine that the size of the first candidate window meets or exceeds a threshold size for receiving the autonomous vehicle; and after determining that the size of the first candidate window meets or exceeds the threshold size for receiving the autonomous vehicle, cause the autonomous vehicle to change lanes by moving into a portion of the first candidate window.

8. The device of claim 7, wherein the at least one processor is further configured to, prior to determining that the size of the first candidate window meets or exceeds the threshold size for receiving the autonomous vehicle, cause the autonomous vehicle to activate a turn signal on a side of the autonomous vehicle proximate the adjacent lane of the first candidate window.

9. The device of claim 6, wherein determining the selected first transit time with the lowest movement cost comprises solving a minimization problem for an accumulated jerk associated with the autonomous vehicle moving longitudinally along the current lane of the road from the current position to the initial position adjacent to the candidate window in the plurality of first transit times.

10. The device of claim 6, wherein determining the second trajectory portion comprises:

determining, for each of a plurality of fourth transit times after the selected first transit time, a lane-change cost based on derivatives of one or more of a position, velocity, or acceleration associated with the autonomous vehicle moving longitudinally and laterally from the initial position into the candidate window in the selected second transit time in the plurality of fourth transit times;

determining a selected second transit time with the lowest lane-change cost;

determining the second trajectory portion corresponding to a set of positions, velocities, and accelerations associated with the autonomous vehicle moving longitudinally and laterally from the initial position into the candidate window in the selected second transit time.

11. The device of claim 10, wherein the at least one processor is further configured to determine, for each trajectory, the cost associated with moving the autonomous vehicle along the trajectory based on a cumulative cost of the first trajectory portion and second trajectory portion of the trajectory, wherein the cumulative cost is determined based on one or more of positions, velocities, or accelerations of the autonomous vehicle moving along the first trajectory portion and the second trajectory portion for the trajectory.

12. A method performed by one or more processors of a control device communicatively coupled to an autonomous vehicle configured to travel along a road, the method comprising:

determining that the autonomous vehicle should move from a current lane of the road to an adjacent lane of the road;

determining two or more candidate windows into which the autonomous vehicle may move in the adjacent lane, wherein each candidate window corresponds to a physical space in the adjacent lane between two vehicles traveling in the adjacent lane;

determining, for each candidate window, a corresponding trajectory for moving the autonomous vehicle from a current position to a final position within the candidate window, wherein the determining, for each candidate window, the corresponding trajectory comprises:

determining a first trajectory portion associated with the autonomous vehicle moving longitudinally along the current lane of the road from the current position to an initial position adjacent to the candidate window, wherein the determining the first trajectory portion comprises:

determining, for each transit time of a plurality of third transit times, a movement cost based on derivatives of one or more of a position, velocity, or acceleration associated with the autonomous vehicle moving longitudinally along the current lane of the road from the current position to the initial position adjacent to the candidate window in the transit time of the plurality of third transit times;

determining a selected first transit time with the lowest movement cost; and determining the first trajectory portion corresponding to a set of positions, velocities, and accelerations associated with the autonomous vehicle moving longitudinally along the current lane of the road from the current position to the initial position adjacent to the candidate window in the selected first transit time; and determining a second trajectory portion associated with the autonomous vehicle moving longitudinally and laterally from the initial position into the candidate window;

determining, for each trajectory, a cost associated with moving the autonomous vehicle along the trajectory;

determining that a first cost of moving the autonomous vehicle along a first trajectory into a first candidate window is less than a second cost of moving the autonomous vehicle along a second trajectory into a second candidate window;

determining a first transit time that corresponds to a time within which the autonomous vehicle can move to the adjacent lane in the first candidate window;

determining a second transit time that corresponds to a time within which the autonomous vehicle can move to the adjacent lane in the second candidate window;

determining that a ratio of a size of a third candidate window with respect to the first candidate window is less than a threshold ratio;

excluding the third candidate window from the two or more candidate windows in response to that the ratio of the size of the third candidate window with respect to the first candidate window is less than the threshold ratio;

determining that the first transmit time leads to a smaller change in velocity and a smaller change in position of the autonomous vehicle than the second transit time; and in response to determining that the first cost of moving the autonomous vehicle along the first trajectory is less than the second cost and that the first transmit time leads to a smaller change in velocity and a smaller change in position of the autonomous vehicle than the second transit time, causing the autonomous vehicle to begin moving along the first trajectory.

13. The method of claim 12, wherein:

a size of the first candidate window is less than a threshold size for receiving the autonomous vehicle; and the one or more processors further performs, after causing the autonomous vehicle to begin moving along the first trajectory:

causing the autonomous vehicle to move to an initial position in the current lane adjacent to the first candidate window;

monitoring the size of the first candidate window; and after monitoring the size of the first candidate window for a period of time, determining that the size of the first candidate window meets or exceeds a threshold size for receiving the autonomous vehicle; and after determining that the size of the first candidate window meets or exceeds the threshold size for receiving the autonomous vehicle, causing the autonomous vehicle to change lanes by moving into a portion of the first candidate window.

14. The method of claim 13, wherein the one or more processors further performs, prior to determining that the size of the first candidate window meets or exceeds the threshold size for receiving the autonomous vehicle, causing the autonomous vehicle to activate a turn signal on a side of the autonomous vehicle proximate the adjacent lane of the first candidate window.

15. The method of claim 12, wherein the determining the selected first transit time with the lowest movement cost comprises solving a minimization problem for an accumulated jerk associated with the autonomous vehicle moving longitudinally along the current lane of the road from the current position to the initial position adjacent to the candidate window in the plurality of first transit times.

16. The method of claim 12, wherein the determining the second trajectory portion comprises:

determining, for each of a plurality of fourth transit times after the selected first transit time, a lane-change cost based on derivatives of one or more of a position, velocity, or acceleration associated with the autonomous vehicle moving longitudinally and laterally from the initial position into the candidate window in the selected second transit time in the plurality of fourth transit times;

determining a selected second transit time with the lowest lane-change cost;

determining the second trajectory portion corresponding to a set of positions, velocities, and accelerations associated with the autonomous vehicle moving longitudinally and laterally from the initial position into the candidate window in the selected second transit time.

17. The method of claim 16, wherein the one or more processors further performs the determining, for each trajectory, the cost associated with moving the autonomous vehicle along the trajectory based on a cumulative cost of the first trajectory portion and second trajectory portion of the trajectory, wherein the cumulative cost is determined based on one or more of positions, velocities, or accelerations of the autonomous vehicle moving along the first trajectory portion and the second trajectory portion for the trajectory.

* * * * *